United States Patent [19]

Yamazaki

[11] Patent Number: 5,208,266

[45] Date of Patent: May 4, 1993

[54] LIGHTLY CROSSLINKED POLYMERIC FOAMS AND PROCESS FOR MAKING SAME

[76] Inventor: Toshimichi Yamazaki, 27 Tanager Rd., Hyannis, Mass. 02601

[21] Appl. No.: 874,814

[22] Filed: Apr. 28, 1992

[51] Int. Cl.$^5$ ................................................ C08J 9/14
[52] U.S. Cl. .......................................... 521/79; 521/81; 521/85; 521/88; 521/94; 521/96; 521/143; 264/53
[58] Field of Search .............. 521/79, 81, 85, 88, 521/94, 96, 143; 264/53

[56] References Cited

U.S. PATENT DOCUMENTS

| | | | |
|---|---|---|---|
| 3,452,123 | 6/1969 | Beckmann et al. | 521/79 |
| 4,252,906 | 2/1981 | Hosokawa et al. | 521/86 |
| 4,298,706 | 11/1981 | Ueno et al. | 521/56 |
| 4,421,867 | 12/1983 | Nojiri et al. | 521/82 |
| 4,446,254 | 5/1984 | Nakae et al. | 521/81 |
| 4,554,293 | 11/1985 | Park | 521/79 |
| 4,567,208 | 1/1986 | Kuwabara et al. | 521/59 |
| 4,569,950 | 2/1986 | Hoshi et al. | 521/79 |
| 4,581,383 | 4/1986 | Park | 521/79 |
| 4,596,833 | 6/1986 | Endo et al. | 521/56 |
| 4,605,682 | 4/1986 | Park | 521/79 |
| 4,626,555 | 12/1986 | Endo et al. | 521/56 |
| 4,640,933 | 2/1987 | Park | 521/79 |
| 4,652,588 | 3/1987 | Park | 521/79 |
| 4,656,074 | 4/1987 | Conley et al. | 521/81 |
| 4,663,361 | 5/1987 | Park | 521/79 |
| 4,694,025 | 9/1987 | Park | 521/79 |
| 4,694,027 | 9/1987 | Park | 521/79 |
| 4,714,716 | 12/1987 | Park | 521/79 |
| 4,719,039 | 1/1988 | Leonard | 521/79 |
| 4,739,547 | 4/1988 | Tanaka et al. | 521/81 |
| 4,762,860 | 8/1988 | Park | 521/79 |
| 4,791,143 | 12/1988 | Tanaka et al. | 521/81 |
| 4,791,147 | 12/1988 | Tanaka et al. | 521/81 |
| 4,918,111 | 4/1990 | Tanaka et al. | 521/81 |

*Primary Examiner*—Morton Foelak
*Attorney, Agent, or Firm*—Abelman, Frayne & Schwab

[57] ABSTRACT

A lightly crosslinked polymer foam and a process for its production, wherein the crosslinking occurs in the extruder, which comprises melt processing an olefinic polymer, with a volatile blowing agent, a free-radical generating peroxide as a crosslinking agent, and an antioxidant as a countervailing agent.

12 Claims, 1 Drawing Sheet

LIGHTLY CROSSLINKED POLYMERIC FOAMS AND PROCESS FOR MAKING SAME

BACKGROUND OF THE INVENTION

This invention relates to a method for the production of lightly crosslinked polyolefin foams and the foams produced thereby and, more particularly, to a method of producing such foams wherein the crosslinking occurs within the confines of the extrusion equipment and the resulting lightly crosslinked foams have a fine closed cellular structure.

Numerous processes are known for the manufacture of polyolefin foams. Polyolefin foams are classified into two main categories, namely, crosslinked and non-crosslinked polyolefin foams.

Foams in each of the foregoing categories have their application and usage in specific segments of the marketplace. For example, a need for crosslinked foams, notwithstanding their high cost, exists in that market segment which demands that the foam possesses certain mechanical or physical properties, namely, relatively low compression set and compression creep and a high draw rate, and certain thermal properties, namely, relatively high heat resistance.

Non-crosslinked foams, which have a larger cell structure, but poor mechanical and thermal strength, meet a demand which prevails in that market segment which requires lower cost materials, for example, cushioned packaging materials or floatation materials.

The inherent advantages in mechanical properties of crosslinked foams result, in most instances, from their small cell structure, i.e., small cell size, and the fact that closed cells predominate. The advantage in thermal properties of cross-linked foams, such as heat resistance and deep draw, are, in most instances, brought about by the cross-linking of the polyolefin resin itself.

In reviewing the polyolefin foam market, those applications where crosslinked foams are used, instead of non-crosslinked foams, are due mostly to its smaller cell size, which results in its preferred physical and mechanical properties, such as excellent appearance of the foam surface, lower compression set, lower compression creep, deeper draw and good processing during fabrication. While crosslinked foams offer better thermal resistance, purchasers do not regard this feature as being especially significant. Thus, noncrosslinked foams having a small cell size are available to capture a considerable portion of the market for crosslinked foams.

From the standpoint of foam manufacturing processes, there are numerous processes available to manufacture both crosslinked and non-crosslinked foams.

Crosslinked polyolefin foams can be manufactured by any of the following representative processes which are conventional in the art.

(a) Irradiation Crosslinked Foam Process

The material of this process is produced, as a first step, by making a foamable solid compound (matrix), utilizing extrusion equipment. The matrix is comprised mainly of a polyolefin resin, a chemical blowing agent and co-agents thereof. Next the matrix, or the polyolefin resin itself, is irradiated utilizing an irradiation-unit that generates electron-beams. Thereafter the irradiated matrix is caused to foam by utilizing hot air ovens (vertical and/or horizontal), or a salt bath. In this process, no peroxide is added to cause crosslinking, and none of the crosslinking reaction takes place in the extrusion equipment, but rather subsequent to the completion of the extrusion process.

(b) Chemically Crosslinked Polyolefin Foam Process

The material of the process is produced by first making a crosslinkable and foamable solid compound, known as the matrix, utilizing extrusion equipment. The matrix comprises, in the main, a polyolefin resin, a chemical blowing agent and co-agents thereof, and peroxides as a main agent for crosslinking and co-agents thereof. Thereafter, the matrix, or the polyolefin resin itself, is crosslinked via a reaction between the resin and the peroxide under the lower heat found in the front part of a hot air oven, which is located subsequent to the extruder. Thereafter, the crosslinked matrix is caused to foam under the high heat found in the rear part of the hot air oven.

In this process, relatively large amounts of peroxide are fed through extrusion equipment when making the matrix. However, none of the crosslinking reaction takes place in the extrusion equipment. Avoidance of crosslinking in the extruder is accomplished by controlling the temperature profile in the extrusion equipment.

(c) Chemically Crosslinked Polyolefin Foamed BUN Process

The foamed material of this process is produced by making a crosslinkable and foamable solid compound (block), utilizing a polyolefin resin, a chemical blowing agent and co-agents thereof, and peroxides as a main agent for crosslinking and co-agents thereof. Thereafter, the cross-linking and foaming are accomplished stepwise, with both of these steps taking place in a press. In this process, extrusion equipment is not utilized.

d) Grafted Resin Crosslinked Polyolefin Foam Process

The foam material of this process can be produced by either of two methods. In the first method, the first step involves the formation of a crosslinkable and foamable solid compound (matrix), utilizing extrusion equipment. That matrix comprises a grafted polyolefin resin, a chemical blowing agent and a co-agent thereof. After extrusion is completed, crosslinking of the matrix, or the grafted polyolefin resin itself, is accomplished by heat and moisture, the reaction taking place by grafting inside the resin. Thereafter, the crosslinked matrix is caused to foam by placement in a hot air oven or a salt bath.

In the second method, the materials comprising the matrix are a grafted polyolefin resin and additives, such as a nucleating agent and an aging agent. They are fed into extrusion equipment along with a physical blowing agent, which is fed into the middle of the extrusion equipment. (This is exactly the same processing means as is used for the manufacture of non-crosslinked extruded foams.)

This foam is not yet crosslinked by grafting, or is so designed that none of the grafting, i.e., crosslinking, reaction takes place, by utilizing a very dry, moisture-free grafted resin. Thereafter, the foam formed after extrusion is crosslinked by the application of heat and moisture. These processes are so designed so as to purposefully avoid the crosslinking (grafting) reaction from taking place within the extrusion equipment.

In all of the above-mentioned processes for the manufacture of crosslinked polyolefin foams, the aim is to prevent the crosslinking reaction from occurring within the extrusion equipment. Furthermore, it is imperative in all of these processes that the level of crosslinking of the final foamed products be kept at a relatively high level, namely, from 25%–90% as measured by Gel %. In other words, the above-mentioned crosslinked foams are either highly or completely crosslinked.

The extent or degree of crosslinking of the foams is measured by a standard test method, known as ANSI/ASTM D2765, which determines the degree of gel content by utilizing a solvent extraction technique. However, this test exhibits a relatively high degree of error in its measurements, especially so in the case of measurements conducted for lower degrees of crosslinking, for example, from about 1%–20% of gel in the crosslinked polyolefin foams.

In the case of non-crosslinked foams, numerous methods of production have been reported, which mostly refer to methods for producing foams of lighter density, methods for aging and/or curing consistency of foamed materials after production, methods for the production of foams with smaller cell structure, etc.

The foregoing are achieved by, for example, employing different types of physical blowing agents, or different types of nucleating agents, or different types of aging and/or curing agents, or different types of foaming systems and/or specialized equipment at the exit end of the extrusion equipment.

For example, to make a non-crosslinked polyolefin foam having a finer cell size with the use of extrusion equipment, the art has taught the utilization of a specific cylinder which is installed at the exit end of the extruder, where the melt from the extruder is introduced, and the accumulated melt in the cylinder is fed out batchwise to the atmosphere to obtain considerably larger amounts of output through the cylinder, regardless of the output through the extruder. By means of this method, the cylinder induces a higher pressure drop at the die slit, which results in a smaller cell size.

In any event, however, it is clear that none of these conventional methods for the production of either crosslinked or non-crosslinked polyolefin foams disclose or refer to effecting crosslinking within the confines of the extrusion equipment to produce a lightly crosslinked polyolefin foam having a finer cell structure, which the present invention is directed to achieving.

Aside from these conventional methods of making either crosslinked or non-crosslinked foams, we have recently seen reference in the patent literature to processes for making lightly crosslinked polymeric foams. U.S. Pat. Nos. 4,605,682 and 4,714,716 discloses lightly crosslinked linear olefinic polymer foams where only dicumyl peroxide (DCP) was used as a crosslinking agent with the aim of increasing the compatibility between polyethylene and polystyrene and/or activation of melt pressure behind the extruder die orifice over 400 psi. In these patents, a very small quantity, for example, from 50–800 ppm of dicumyl peroxide is added to the process to create changes in the physical properties of the foam, which is determined in a conventional manner by checking or determining the cell size, ratio of open cells and the appearance of the foam. However, these patents demonstrate that the resulting foams had voids, hairy skin, wobbly strands and ripples at the edges as a result of crosslinking only with dicumyl peroxide. In addition to the foregoing results, Table VIII of U.S. Pat. No. 4,714,716 shows that the results attained in Test No. 1, in the absence of dicumyl peroxide, gave a cell size of only 0.3 mm, which is smaller than the average cell sizes of 0.35 mm, 0.40 mm., 0.45 mm and 0.60 mm obtained in Test Nos. 2, 3, 4 and 6, with the addition of 54 ppm, 100 ppm, 123 ppm and 200 ppm, respectively, of DCP. U.S Pat. No. 4,714,716 indicates that the greater the quantity of DCP employed, the larger is the size of the cell.

The undesirably poor foam quality resulting from the processes disclosed in U.S. Pat. Nos. 4,605,682 and 4,714,716, would appear to be fundamentally attributable to the local effect of crosslinking during processing inside the extrusion equipment. In other words, a slight quantity, for example, from 50–500 ppm of dicumyl peroxide (DCP) alone, based on the resin feed rate, with a melt residence time of say, 2–10 minutes in the extruder, does not provide sufficient time to obtain satisfactory dispersion of the DCP. Further, the use of small quantities of DCP alone when effecting crosslinking, results in too high a degree of reactivity and localization of crosslinking. Thus, the sought-after goal of light and uniform crosslinking within the extrusion equipment is not achieved. Furthermore, even the usage of a mixture of DCP with diluents, such as clay, talc or silica, does not provide the desired dispersion of DCP during processing through the extrusion equipment.

SUMMARY OF THE INVENTION

This present invention relates to a process for producing a lightly crosslinked polymer foam material, comprising the steps of: (a) melt processing an olefinic polymer, together with a volatile blowing agent, a sufficient amount of a free radical generating peroxide as a crosslinking agent, and an organic antioxidant to form a flowable admixture; and (b) extruding said mixture through a die to a zone of lower pressure and activating said blowing agent to expand the polymer to form a cellular lightly crosslinked polymer foam material. The present invention also contemplates the cellular lightly crosslinked polyolefin foam having a fine cell structure produced by the process of the present invention.

When the resulting lightly crosslinked foamed polymer product of the present invention exits from the extruder, it has a small cell structure in which closed cells predominate and may be in various shapes, such as, for example, a sheet, plank, rod, pipe or profiled shape. As a result of the process of the present invention, the foam produced is only lightly crosslinked, say, from about 0.01% to about 20% gel.

DETAILED DESCRIPTION OF THE INVENTION

Figure 1:
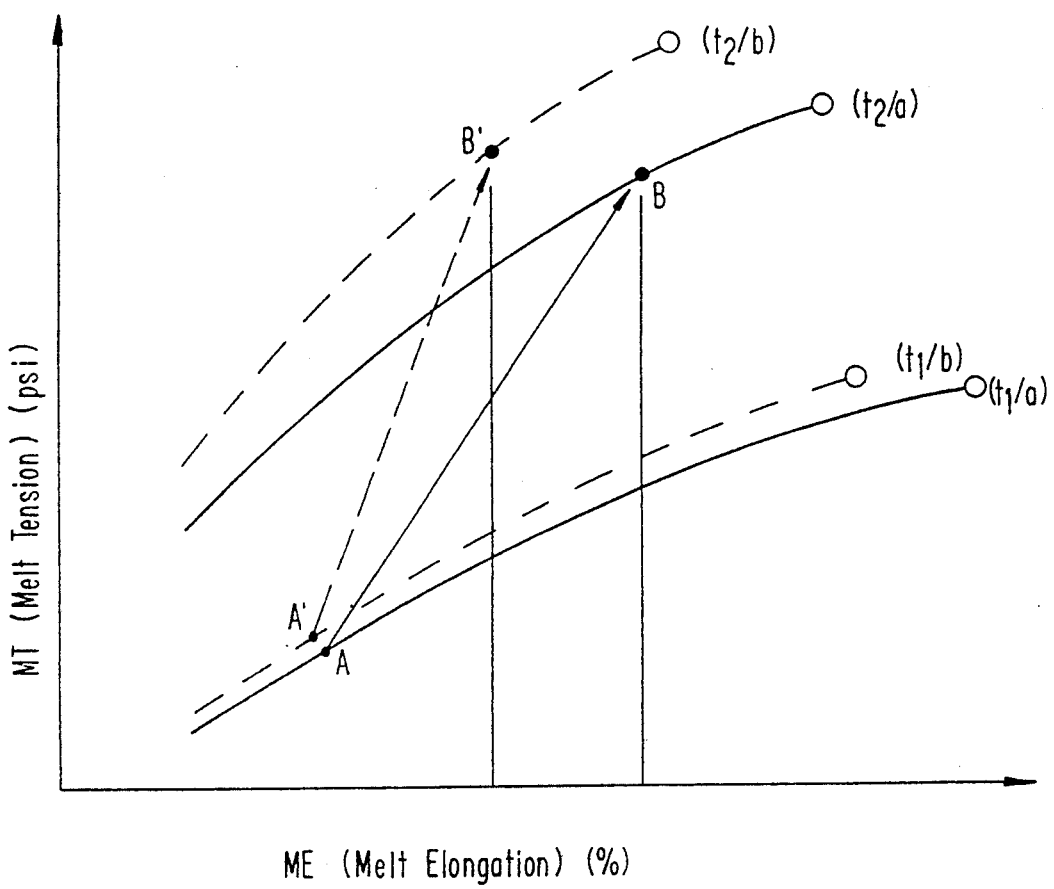
FIG. 1 is a graph showing the relationship between the Melt Tension (MT) and the Melt Elongation (ME) of a lightly crosslinked resin and a non-crosslinked resin.

The essence of the present invention for making a lightly crosslinked polyolefin foam, is fundamentally based on the usage of a large amount of a free radical generating organic peroxide crosslinking agent, which has a relatively low degree of reactivity to resin, in combination with an antioxidant, as a free radical terminator or countervailing agent. The reactivity of the peroxide is expressed by its decomposition temperature at a one (1) minute half-life time.

The processing of extruded, lightly crosslinked polyolefin foams in accordance with the present invention comprises feeding the raw materials, namely, polyolefin resin, the peroxide, the antioxidant, the nucleating agent, and an aging and/or curing agent through the extruder throat, as well as by physically feeding a blowing agent through the feed nozzle located in the melt-zone of the extruder. During mixing and dispersing of these materials inside the extruder, a so-called "melt" is generated. This melt is composed in the main of a solution of resin and physical blowing agent, and partly of an emulsion of the same. This is the reason that the melt temperature can be decreased to about 90° C.-100° C., which is lower than the melt temperature of the resin itself, and also permits adjustment to the proper temperature range of the "melt" for foaming. When foaming, this "melt" is fed through a so-called die slit, which is a slight opening at the exit end of the die which can assume any configuration or shape, for example, circular, straight, or a profiled shape. The pressure of the "melt" behind the die-slit, which is from about 50-150 kg/cm², is decreased suddenly down to atmospheric pressure and the physical blowing agent vaporizes to cause the formation of a foamed cell structure. During the formation of the foamed cell structure, the temperature of the resin itself is also decreased, mostly because of cooling by latent heat that is caused by vaporization of the physical blowing agent, which is in the range of, say, about, 10° C.-25° C., though this range is subject to the variation in the expansion ratio of foamed products.

As is shown in FIG. 1, during the change of resin temperature from t1 to t2, the physical properties of the resin itself changes. In the case of non-crosslinked resin, from A to B, and in the case of a lightly crosslinked resin from A' to B'. FIG. 1 shows the relationship between MT (Melt Tension) and ME (Melt Elongation) at each temperature (t1 and t2), in the case of both a non-crosslinked resin (t1/a & t2/a) and a lightly crosslinked resin (t1/b & t2/b). Generally speaking, as a result of crosslinking, the difference of MT/ME at lower temperatures between (t2/a) and (t2/b), i.e., B and B', becomes greater than the difference of MT/ME at higher temperature between (t1/a) and (t1/b), i.e. A and A'. The foregoing means that a lightly crosslinked resin needs less elongation, or has no need to elongate the cell skin to too great a degree, to reach almost the same level of tension of the cell skin that serves to build up cell structure, and this is the reason why any level of crosslinking results in a finer cell size.

Although highly crosslinked foams are outside the scope of this invention, in point of fact, highly crosslinked foams made via any type of processing, for example, irradiation crosslinked foams, chemically crosslinked foams, or silane-grafting crosslinked foams, which have a gel % of about 25% to about 90%, are all made with small cell structures, though these foams are not available for manufacture by crosslinking within the extrusion equipment, which the instant invention relates to.

Therefore, the raw materials, especially the crosslinking agents, peroxides in this invention, and countervailing agents, antioxidants in this invention, must be selected to achieve the above mentioned relationship, which is best depicted in FIG. 1.

The selection of suitable peroxides, under the actually applicable operating conditions, must be made by taking the role and functions of peroxides themselves into consideration. Those factors and functions are: (1) reactivity that is determined by the decomposition temperature at one (1) minute half-life time; (2) theoretical amount of activated oxygen generated; (3) activation energy; (4) crosslinking efficiency, achieved by the appropriate selection, in combination, of the type of peroxide and the type of polyolefin resin; (5) melt temperature; (6) volatility; and (7) crosslinking efficiency, achieved by the type of diluent or absorbent employed, which are utilized for the purpose of easier handling, better dispersion during processing, improved safety, etc. In this connection, the selection of crosslinking co-agents which aid in crosslinking, for example, quinondioxime, methaacrylates, allylmalleimide, etc., although they are not necessary to the practice of the present invention, they may be employed to advantage.

The selection of suitable antioxidants, under the actually applicable operating conditions, must also be made by taking the functions of the antioxidants themselves into consideration, for example, those functions are: (1) countervailing efficiency, i.e., reactivity to peroxides, (2) melt temperature, etc.

Also, the ratio of crosslinking agents, i.e., peroxides, against polyolefin resin, and the ratio of countervailing agents, i.e., antioxidants, against peroxides, must be carefully selected to achieve the above-mentioned relationship, as is best shown in FIG. 1. For example, if the level of crosslinking is too low, it results in a foam which does not have the desired small cell size. If the level of crosslinking is too high, the resulting foam is characterized by uneven expansion, local collapse, cellular striation, local shrinkage, voids and/or puncture.

Consequently, the levels of peroxide and antioxidant to be utilized in this invention are as follows: (a) the weight ratio of peroxide to polyolefin resin should be from about 1 to about 20,000 ppm, preferably 200-5,000 ppm, and (b) the weight ratio of antioxidant to peroxide should be 0.01-50.0 wt./wt., preferably 0.50-5.0 wt./wt. As was mentioned previously, these ranges may vary and are subject fundamentally to: (1) the type of peroxide employed; (2) the type of antioxidant; (3) the type of polyolefin resin; (4) the type of physical blowing agent; (5) the residence time of the melt inside the extrusion equipment; (6) the restricted temperature profile of the melt inside the extrusion equipment; (7) the expansion ratio of the lightly crosslinked foamed product, etc.

It is not easy to determine the small amount of Gel % of the lightly crosslinked polyolefin foams of this invention under ASTM D2765. However, repeated measurements of the Gel % and the analytical and empirical calculation therefrom, demonstrate that the Gel % to make this invention effective, in other words, the Gel % necessary to make smaller cell structure without any of the above-mentioned defects, either inside or outside of the foamed products, is between about 0.1% and about 20%, with from about 2% to about 10% being preferred. This variation in the range depends for the most part upon the type of polyolefin resin employed.

The polyolefin resins for use in the present invention are preferably homopolymers, copolymers, and terpolymers of ethylenic resins, for example, polyethylene, including linear polyethylene having a density in the range of from about 0.91 to about 0.94, ethylene-vinylacetate copolymer, ethylene-ethylacrylate copolymer, ethylene-propylene copolymer and ethylene-propylene terpolymer, and mixtures thereof. Under conditions of actual usage, these resins can be in the form of a powder, which includes a pulverized resin, or pellets.

The physical blowing agents which can be employed in the present invention are preferably chlorofluorocarbons, such as, for example, CFC-11, -12, -113, -114;

hydrochlorofluorocarbons, for example, HCFC-22, -124, -142b; hydrofluorocarbons, for example, HFC-134a, -152a; hydrocarbons, for example, propane, n-butane, isobutane, pentanes; and carbon dioxide, nitrogen, methylene chloride, etc., and any mixtures thereof.

The nucleating agents which can be employed in the present invention are, preferably, either inorganic nucleators, which include, for example, talc, silica, calcium or sodium carbonate, calcium or sodium sulfate, or organic and inorganic heat-decomposing type nucleators, for example, azodicarbonamide, sodium bicarbonate, etc., or any mixture thereof.

The aging agents which can be employed in the present invention are preferably partial esters of long chain fatty acids with polyols, high alkyl amines, fatty acid amides, olefinically unsaturated carboxylic acid copolymers. These include, for example, glyceryl mono- and/or di-stearate, dimethyl stearamine, behenamide, oleamide, N,N'-ethylenebisstearamide, etc., and any mixtures thereof.

The peroxides which can be employed in the present invention are, for example, hydroperoxides, dialkyl peroxides, diacyl peroxides, peroxyesters and ketone peroxides, having decomposition temperatures at a one (1) minute half-life time higher than 130° C., preferably 150° C.–270° C., when using either a single peroxide, or a mixture of peroxides. Exemplary peroxides which can be employed in the process of the present invention are:
di-isopropylbenzene hydroperoxide,
t-butyl hydroperoxide,
1,1-bis (t-butyl peroxy) 3,3,5-trimethyl cyclohexane,
2,2-bis (4,4-di-t-butyl peroxy cyclohexyl) propane,
1,1-di (t-butyl peroxy) cyclohexane,
n-butyl, 4,4-bis (t-butyl peroxy) valerate,
dicumyl peroxide,
2,5-dimethyl, 2,5-di (t-butyl peroxy) hexane,
a,a'-bis (t-butyl peroxy) diisopropyl benzene,
2,5-dimethyl, 2,5-di (t-butyl peroxy) hexyne-3,
di-t-butyl peroxide,
succinic acid peroxide,
2,5-dimethyl, 2,5-di (benzoyl peroxy) hexane,
2,5-dimethyl, 2,5-di (benzoyl peroxy) hexyne-3
t-butyl peroxy acetate
t-butyl peroxy benzoate, and
cyclohexanone peroxide.

The antioxidants which can be employed in the present invention are any type of antioxidant with a melt or softening temperature of from 60° C. to about 180° C., preferably from about 100° C. to about 150° C., when using a single antioxidant alone, or a mixture of antioxidants. Exemplary antioxidants are:
aldol-a-naphthylamine,
phenyl-b-naphthylamine;
1,2-dihydro-, 2,2,4-trimethyl-quinoline,
N,N'-diphenyl-p-phenylenediamine,
phenyl-, cyclohexyl-p-phenylenediamine,
N-isopropyl-N'-phenyl-p-phenylenediamine,
diallyl-p-phenylenediamine,
2,6-di-t-butyl-p-cresol,
2,2'-methylene-bis (4-methyl-6-t-butylphenol),
2,2'-methylene-bis (4-ethyl-6-t-butylphenol),
4,4'-thio-bis (6-t-butyl-m-cresol), and
nonyl phenyl phosphite.

Other additives which may be used advantageously in the present invention, along with the standard materials mentioned above are, for example, antistatic agents, flame retardants, colorants, etc.

The specific examples which follow are intended to illustrate the invention, but are not to be taken as limiting its scope. Parts and percentages are by weight, unless specified to the contrary.

EXAMPLES

In the following examples a single screw, tandem extruder is employed. The first extruder has a diameter of 115 mm and a length/diameter (L/D) of 28/1 and a temperature profile of 165°/170°/175°/170°/160°/160° C. The second extruder has a diameter of 150 mm and an L/D of 25/1 and a temperature profile of 150°/120°/110°/100°/95°/95° C.

The first extruder has a feeding zone for feeding polyolefin resin pellets, the nucleating agent, the aging and/or curing agent and the peroxide and antioxidant. The peroxide and antioxidant can be fed separately, or they can be combined and fed in as a compound to the feeding zone. After the feeding zone, there is a melting zone, followed by a metering zone and, finally, a mixing zone. The physical blowing agent is injected through the feed nozzle between the metering and mixing zones.

After exiting from the mixing zone of the first extruder, the melt passes through a pipe which connects the first and second extruders, and enters the second extruder. In the second extruder the melt is cooled down to an appropriate temperature to allow it to exit the die assembly as a foam via the circular die.

The foamed sheet exiting the circular die is about 1000 mm in width, 10 mm in thickness and 30 times in its expansion ratio.

In the experiments which follow, the residence time in the first extruder is calculated to be about six (6) minutes. The resin is a low density polyethylene known as Petrothene NA952 by Quantum Chemical Corp., which has a melt index of 2.0 g/10 min. and a density 0.918 g/cm$^3$. Its feed rate is 200 kg/hr. The physical blowing agent is iso-butane and its feed rate is 25–28 kg/hr. The nucleating agent is Mistron from Cyprus Ind. Minerals, which comprises 70% low density polyethylene and 30% talc, and its feed rate is 1.0 kg/hr as talc. The aging agent is Atmul 918K from Humko Chemical which is glycerol monostearate and its feed rate is 2.2 kg/hr.

In each of the seven (7) runs listed below, A-1 to A-7, inclusive, a different peroxide is indicated. Listed below are the peroxides, their decomposition temperature at one (1) minute half life time and the theoretical percentage of activated oxygen which each generates. All of the peroxides are available from Nippon Oil & Fat Company.

| Peroxide | Decomposition Temperature at 1 min. half life | Activated Oxygen |
|---|---|---|
| (A-1) Di-isopropylbenzene Hydroperoxide (trademark; Percumyl P) | 205° C. | 8.24% |
| (A-2) Dicumyl Peroxide (trademark; Percumyl D-40) | 171° C. | 5.92% |
| (A-3) a,a'-Bis (t-butyl peroxy) Diisopropyl Benzene (trademark; Peroximon F-40) | 182° C. | 9.45% |
| (A-4) 2,5-Dimethyl 2,5-di(t-butyl peroxy) Hexyne-3 (trademark; Perhexyne 25B-40) | 193° C. | 11.17% |
| (A-5) Succinic Acid Peroxide (trademark; Peroyl SA) | 144° C. | 6.83% |
| (A-6) 2,5-Dimethyl, 2,5-di (benzoyl peroxy) Hexane | 162° C. | 8.28% |

-continued

| Peroxide | Decomposition Temperature at 1 min. half life | Activated Oxygen |
|---|---|---|
| (trademark; Perhexa 25Z) | | |
| (A-7) Cyclohexanone Peroxide (trademark; Perhexa H) | 174° C. | 12.99% |

In each of the experiments listed below, the antioxidant is either:

(B-1) 2,2'-Methylene-bis (4-methyl-6-t-butylphenol) (trademark; MDP), or (B-2) 4,4'-Thio-bis (6-t-butyl-m-cresol) (trademark; WX-R).

Both antioxidants are supplied by Sumitomo Chem. Co.

TABLE 1

| | Peroxides | | Antioxidants | | Foam Produced | |
|---|---|---|---|---|---|---|
| Runs | material | ppm(*1) | material | ppm | cell size (*2) | app'ce (*3) |
| BLANK | — | 0 | — | 0 | 18 | r.s. |
| Run #1 | (A-1) | 4,000 | — | 0 | 22 | r.s. |
| | (A-1) | 8,000 | — | 0 | 26 | good |
| | (A-1) | 12,000 | — | 0 | xx | |
| | (A-1) | 12,000 | (B-1) | 7,000 | 28 | good |
| | (A-1) | 15,000 | (B-1) | 9,000 | 28 | good |
| Run #2 | (A-2) | 250 | — | 0 | 19 | r.s. |
| | (A-2) | 500 | — | 0 | 20 | r.s. |
| | (A-2) | 750 | — | 0 | xx | |
| | (A-2) | 750 | (B-1) | 1,500 | 25 | r.s. |
| | (A-2) | 1,500 | (B-1) | 4,000 | 27 | good |
| | (A-2) | 2,000 | (B-1) | 6,000 | 28 | good |
| Run #3 | (A-3) | 250 | — | 0 | 23 | r.s. |
| | (A-3) | 500 | — | 0 | xx | |
| | (A-3) | 500 | (B-2) | 650 | 26 | good |
| | (A-3) | 750 | (B-2) | 1,100 | 28 | good |
| | (A-3) | 1,000 | (B-2) | 1,500 | 30 | v. good |
| | (A-3) | 1,250 | (B-2) | 2,500 | 31 | v. good |
| Run #4 | (A-4) | 250 | — | 0 | 20 | r.s. |
| | (A-4) | 500 | — | 0 | 22 | r.s. |
| | (A-4) | 750 | — | 0 | xx | |
| | (A-4) | 750 | (B-1) | 1,500 | 25 | r.s. |
| | (A-4) | 1,500 | (B-1) | 4,000 | 27 | good |
| | (A-4) | 2,500 | (B-1) | 8,000 | 30 | v. good |
| | (A-4) | 3,000 | (B-1) | 10,000 | 32 | v. good |
| Run #5 | (A-5) | 250 | — | 0 | 19 | r.s. |
| | (A-5) | 500 | — | 0 | xx | |
| | (A-5) | 500 | (B-2) | 650 | 22 | r.s. |
| | (A-5) | 750 | (B-2) | 1,100 | 23 | r.s. |
| | (A-5) | 1,000 | (B-2) | 1,500 | 25 | r.s. |
| | (A-5) | 1,250 | (B-2) | 2,500 | 26 | good |
| Run #6 | (A-6) | 250 | — | 0 | 22 | r.s. |
| | (A-6) | 500 | — | 0 | xx | |
| | (A-6) | 500 | (B-1) | 800 | 23 | r.s. |
| | (A-6) | 750 | (B-1) | 1,500 | 25 | r.s. |
| | (A-6) | 1,000 | (B-1) | 2,300 | 27 | good |
| | (A-6) | 1,500 | (B-1) | 4,000 | 29 | v. good |
| Run #7 | (A-7) | 200 | — | 0 | 20 | r.s. |
| | (A-7) | 400 | — | 0 | xx | |
| | (A-7) | 400 | (B-2) | 500 | 21 | r.s. |
| | (A-7) | 800 | (B-2) | 1,100 | 23 | r.s. |
| | (A-7) | 1,000 | (B-2) | 1,500 | 26 | good |

(*1) as peroxide
(*2) number of cells/inch
(*3) r.s. - rough surface; xx - poor because of striation, collapse, etc.

It is clearly evident from the results in Table I that the lightly crosslinked polyolefin foams of the present invention made in accordance with the process of the present invention, namely, employing in combination a peroxide and an antioxidant to effect improved dispersion during crosslinking in the extruder, results in a foam which possesses a good physical appearance and has a significant number of cells/inch which is indicative of good cell structure.

What is claimed is:

1. A process for the preparation of a lightly crosslinked polymer foam material, comprising the steps of:
   (a) melt processing an olefinic polymer, together with a volatile blowing agent, a sufficient amount of a free radical generating peroxide as a crosslinking agent, said peroxide having a decomposition temperature at a one minute half-life of about 130° C. or greater, the ratio of said peroxide to said olefinic polymer being from about 1 ppm to about 20,000 ppm, and an antioxidant as a countervailing agent to terminate the free radical crosslinking reaction, the weight ratio of said antioxidant to said peroxide being from about 0.01 to about 50.0 wt./wt. to form a flowable admixture; and
   (b) extruding said admixture through a die to a zone of lower pressure and activating said blowing agent to expand the polymer to form a cellular lightly crosslinked polymer foam material.

2. The process of claim 1 in which said peroxide is selected from the group consisting of hydroperoxides, dialkyl peroxides, diacyl peroxides, peroxyesters and ketone peroxides.

3. The process of claim 2 in which peroxide has a decomposition temperature at a one minute half-life of from about 150° C. to about 270° C.

4. The process of claim 1 in which said antioxidant has a melt or softening temperature of from about 60° C. to about 180° C.

5. The process of claim 4 in which said antioxidant has a melt or softening temperature of from about 100° C. to about 150° C.

6. The process of claim 1 in which said polymer is polyethylene.

7. An expandable polymeric composition comprising an olefinic polymer, a free radical generating peroxide as a crosslinking agent, said peroxide having a decomposition temperature at a one minute half-life of about 130° C. or greater, the ratio of said peroxide to said olefinic polymer being from about 1 ppm to about 20,000 ppm, an antioxidant as a countervailing agent to terminate the free radical crosslinking reaction, the weight ratio of said antioxidant to said peroxide being from about 0.01 to about 50.0 wt./wt., and a volatile blowing agent.

8. The composition of claim 7 in which said peroxide is selected from the group consisting of hydroperoxides, dialkyl peroxides, diacyl peroxides, peroxyesters and ketone peroxides.

9. The composition of claim 8 in which said peroxide has a decomposition temperature at a one minute half-life of from about 150° C. to about 270° C.

10. The composition of claim 7 in which said antioxidant has a softening temperature of from about 60° C. to about 180° C.

11. The composition of claim 10 in which said antioxidant has a softening temperature of from about 100° C. to about 150° C.

12. The composition of claim 7 in which said polymer is polyethylene.

* * * * *